April 30, 1935.  J. T. LITTLETON  1,999,770
FILTER AND METHOD OF MAKING IT
Filed June 18, 1934
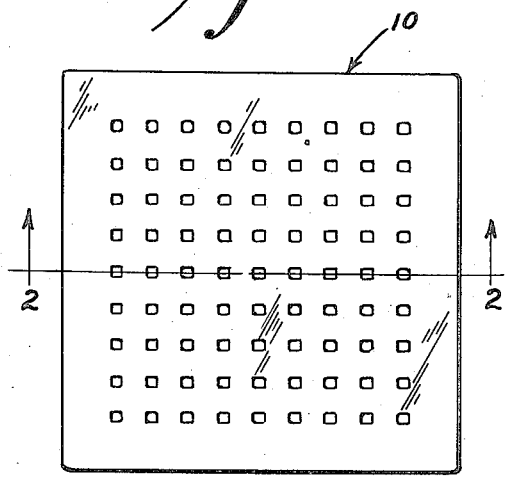
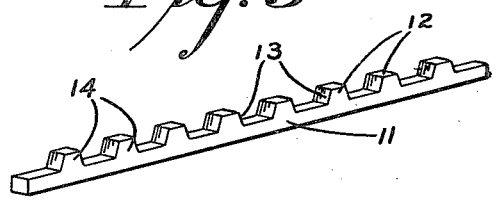
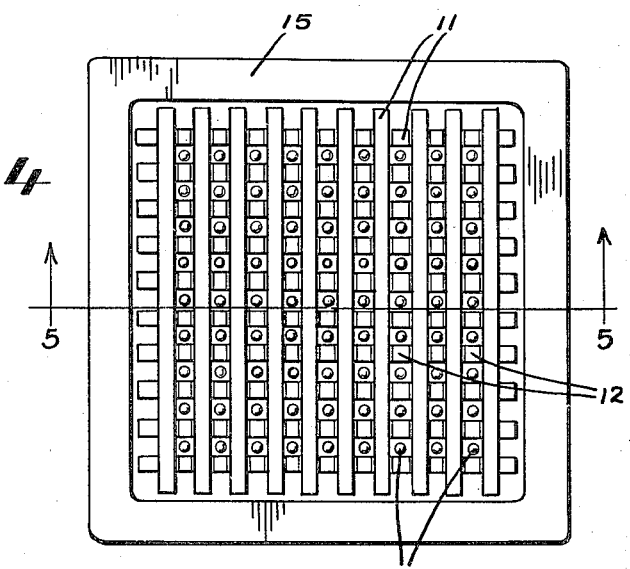
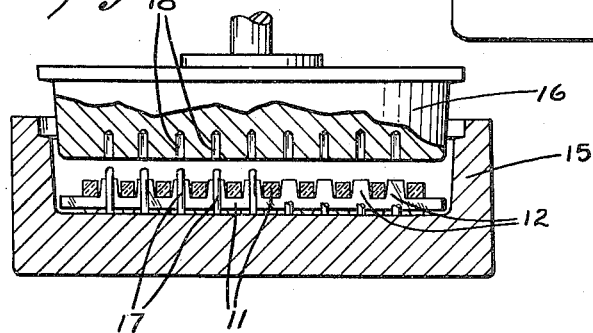
INVENTOR.
JESSE T. LITTLETON
BY
ATTORNEYS.

Patented Apr. 30, 1935

1,999,770

UNITED STATES PATENT OFFICE 1,999,770

FILTER AND METHOD OF MAKING IT

Jesse T. Littleton, Corning, N. Y., assignor to Corning Glass Works, Corning, N. Y., a corporation of New York Application June 18, 1934, Serial No. 731,206

8 Claims. (Cl. 49—82)

This invention relates to a filter and the method of making it and more particularly to a filter made from vitreous materials such as glass.

Glass filters are capable of wide applications in many industries and for household use due to the fact that glass is non-corrosive, impervious and will not contaminate the liquids to be filtered. These attributes have long been recognized but due to the limitations in working the material and the great amount of time and labor heretofore required to produce a glass plate having substantially uniform perforations uniformly distributed throughout its area, the adoption of glass filters for general use has been materially retarded.

The object of the present invention is a glass filter having substantially uniform perforations uniformly distributed throughout its area.

Another object is to simplify and cheapen the manufacture of glass filters.

The above and other objects may be attained by employing my invention which embodies among its features the method which includes forming the plate from preformed strips of glass, each of which has uniformly spaced integral bosses along one side and so arranging the strips that those extending in one direction lie in the spaces between the bosses on the strips which extend at right angles to them and then heating the strips so arranged to cause the glass to fuse together to form a solid plate having substantially uniform perforations uniformly spaced.

In the drawing:

Fig. 1 is a plan view of a filter constructed in accordance with this invention;

Fig. 2 is a transverse sectional view taken on the line 2—2 of Fig. 1;

Fig. 3 is a perspective view of one of the preformed strips from which the filter is made;

Fig. 4 is a plan view of the filter before it is fused together; and

Fig. 5 is a sectional view taken on the line 5—5 of Fig. 4, showing the filter in place in a mold prior to the fusing operation.

Referring to the drawing in detail, a filter designated generally 10 is composed of a plurality of rods 11, each of which is formed along one side with a plurality of uniformly spaced outwardly extending bosses 12 which, as shown in Fig. 5, are preferably greater in length than the thickness of the rod to which they are joined. The faces 13 of the bosses 12 are preferably inclined so that the bosses taper toward their outer ends while the faces 14 of the bosses are preferably parallel and lie flush with the sides of the rods which extend at right angles to the side upon which the bosses 12 are formed.

A plurality of rods 11 thus formed are placed in a mold 15 in spaced parallel relation and with their bosses 12 extending upwardly and similar rods 11 are then placed in the mold at right angles to those first introduced so that they lie in the spaces between the bosses 12 and the faces 13 with their bosses extending downwardly between the rods 11 which were first introduced into the mold. After so arranging the rods in the mold, the whole is subjected to an elevated temperature so as to produce a softening and sintering of the glass together. By exerting pressure on the rods 11 from above, as by means of a mold plunger 16, the softened rods may be pressed together and the glass which formed the projecting ends of the bosses 12 may be squeezed out to fill the spaces formed between the faces 13 and the rods which lie at right angles thereto. In order to prevent the glass thus squeezed from filling the perforations in the plate, I may find it desirable to provide the mold with upstanding pins 17 which enter openings 18 which may be formed in the plunger 16 as the latter descends.

In some cases the use of a mold may be dispensed with altogether and the sintering of the glass may be accomplished while it is supported upon a flat surface with or without the use of the pins 17.

While in the foregoing there has been shown and described the preferred embodiment of my invention, it is to be understood that minor changes in the details of construction, combination, and arrangement of parts may be resorted to without departing from the spirit and scope of my invention as claimed.

What is claimed is:

1. The method of making a glass filter, which includes arranging a plurality of glass rods in spaced parallel relation, supporting a plurality of similar rods in spaced parallel relation on the first mentioned rods with their axes crossing the axes of the first mentioned rods, and heating the rods so arranged to cause them to adhere to one another.

2. The method of making a glass filter which includes arranging a plurality of glass rods in spaced parallel relation, supporting a plurality of similar rods in spaced parallel relation on the first mentioned rods with their axes extending at right angles to the first mentioned rods and heating the rods so arranged to cause them to soften and adhere to one another.

3. The method of making a glass filter which includes arranging a plurality of glass rods in spaced parallel relation, supporting a plurality of similar rods in spaced parallel relation on the first mentioned rods with their axes crossing the axes of the first mentioned rods, and heating the rods so arranged to cause them to adhere to one another, and maintaining the rods in such position while they are soft.

4. The method of making a glass filter which includes arranging a plurality of glass rods in spaced parallel relation, supporting a plurality of similar rods in spaced parallel relation on the first mentioned rods with their axes extending at right angles to the first mentioned rods, heating the rods so arranged to cause them to soften and adhere to one another and maintaining the rods in such position while they are soft.

5. The method of making a glass filter which includes arranging a plurality of glass rods in spaced parallel relation, supporting a plurality of similar rods in spaced parallel relation on the first mentioned rods with their axes crossing the axes of the first mentioned rods, heating the rods so arranged to cause them to adhere to one another and pressing the rods together while they are soft.

6. The method of making a glass filter which includes arranging a plurality of glass rods in spaced parallel relation, supporting a plurality of similar rods in spaced parallel relation on the first mentioned rods with their axes extending at right angles to the first mentioned rods, heating the rods so arranged to cause them to soften and adhere to one another and pressing the rods together while they are soft.

7. The method of making a glass filter which includes arranging a plurality of glass rods in spaced parallel relation, supporting a plurality of similar rods in spaced parallel relation on the first mentioned rods with their axes crossing the axes of the first mentioned rods, heating the rods so arranged to cause them to adhere to one another, maintaining the rods in such position and pressing them together while they are soft.

8. The method of making a glass filter which includes arranging a plurality of glass rods in spaced parallel relation, supporting a plurality of similar rods in spaced parallel relation on the first mentioned rods with their axes extending at right angles to the first mentioned rods, heating the rods so arranged to cause them to soften and adhere to one another, maintaining the rods in such position and pressing them together while they are soft.

JESSE T. LITTLETON.